(12) United States Patent
Li et al.

(10) Patent No.: US 9,535,308 B2
(45) Date of Patent: Jan. 3, 2017

(54) ENHANCED OPTICAL MODULATION USING SLOW LIGHT

(71) Applicant: Oracle International Corporation, Redwood City, CA (US)

(72) Inventors: Guoliang Li, San Diego, CA (US); Ashok V. Krishnamoorthy, San Diego, CA (US); Xuezhe Zheng, San Diego, CA (US); Ying L. Luo, San Diego, CA (US); John E. Cunningham, San Deigo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 252 days.

(21) Appl. No.: 14/036,964

(22) Filed: Sep. 25, 2013

(65) Prior Publication Data

US 2015/0086219 A1    Mar. 26, 2015

(51) Int. Cl.
*G02F 1/035* (2006.01)
*G02F 1/225* (2006.01)
*G02B 6/122* (2006.01)
*G02F 1/21* (2006.01)

(52) U.S. Cl.
CPC ........... *G02F 1/2257* (2013.01); *G02B 6/1225* (2013.01); *G02F 2001/212* (2013.01); *G02F 2202/32* (2013.01)

(58) Field of Classification Search
None
See application file for complete search history.

(56) References Cited

U.S. PATENT DOCUMENTS

| 5,526,449 A * | 6/1996 | Meade ................... B82Y 20/00 385/1 |
| 6,845,198 B2 * | 1/2005 | Montgomery et al. ......... 385/50 |
| 7,298,949 B2 * | 11/2007 | Gothoskar et al. ........... 385/130 |

OTHER PUBLICATIONS

Nguyen, Hong C. et al. "Compact and fast photonic crystal silicon optical modulators", published Sep. 17, 2012, Sep. 24, 2012/vol. 20, No. 20/Optics Express 22465.
Shinkawa, Mizuki et al. "Nonlinear enhancement in photonic crystal slow light waveguides fabricated using CMOS-compatible process", published Oct. 24, 2011/vol. 19, No. 22/Optics Express 22208.

(Continued)

*Primary Examiner* — Uyen Chau N Le
*Assistant Examiner* — Chad Smith
(74) *Attorney, Agent, or Firm* — Park, Vaughan, Fleming & Dowler LLP (57) ABSTRACT

A photonic integrated circuit (PIC) is described. This PIC includes a semiconductor-barrier layer-semiconductor diode in an optical waveguide that conveys an optical signal, where the barrier layer is an oxide or a high-k material. Moreover, semiconductor layers in the semiconductor-barrier layer-semiconductor diode may include geometric features (such as a periodic pattern of holes or trenches) that create a lattice-shifted photonic crystal optical waveguide having a group velocity of light that is lower than the group velocity of light in the first semiconductor layer and the second semiconductor layer without the geometric features. The optical waveguide is included in an optical modulator, such as a Mach-Zehnder interferometer (MZI).

22 Claims, 6 Drawing Sheets

(56) References Cited

OTHER PUBLICATIONS

Shastri Kalpendu, "CMOS Photonics", Asian Communications and Photonics Conference, TuR3 (2009).
Brimont, A. et al. "Low drive voltage 10 Gb/s and high contrast 40 Gb/s silicon slow wave modulators," Group IV Photonics, ThC3, 195-197 (2012).

* cited by examiner

APPLY ELECTRIC POTENTIAL ACROSS A SEMICONDUCTOR-OXIDE-SEMICONDUCTOR DIODE DEFINED BY A REGION OF OVERLAP OF A FIRST SEMICONDUCTOR LAYER, AN OXIDE LAYER AND A SECOND SEMICONDUCTOR LAYER
810

CONVEY AN OPTICAL SIGNAL THROUGH AN OPTICAL WAVEGUIDE THAT INCLUDES THE SEMICONDUCTOR-OXIDE-SEMICONDUCTOR DIODE
812

FIG. 8

ENHANCED OPTICAL MODULATION USING SLOW LIGHT

GOVERNMENT LICENSE RIGHTS

This invention was made with United States government support under Agreement No. HR0011-08-9-0001 awarded by DARPA. The United States government has certain rights in the invention.

BACKGROUND

Field

The present disclosure generally relates to the design of photonic integrated circuits (PICs). More specifically, the present disclosure relates to a PIC that includes an optical modulator based on a Mach-Zehnder interferometer (MZI) that uses light slowed by a lattice-shifted photonic crystal optical waveguide to enhance a semiconductor-oxide-semiconductor diode.

Related Art

Optical interconnects or links based on silicon photonics have the potential to alleviate inter-chip communication bottlenecks in high-performance computing systems that include a large number of processor chips and memory chips. This is because, relative to electrical interconnects, optical interconnects offer significantly improved: bandwidth, density, power consumption, latency, and range.

Figure 1:
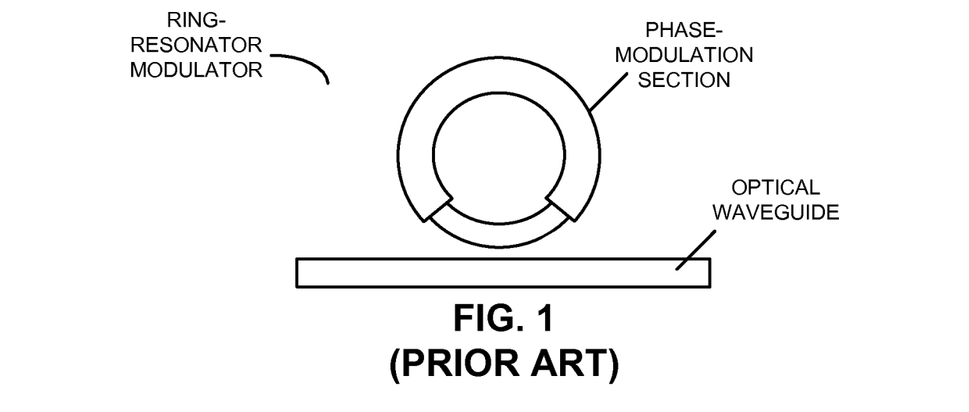
FIG. 1 is a block diagram illustrating an existing ring-resonator modulator.
Figure 2:
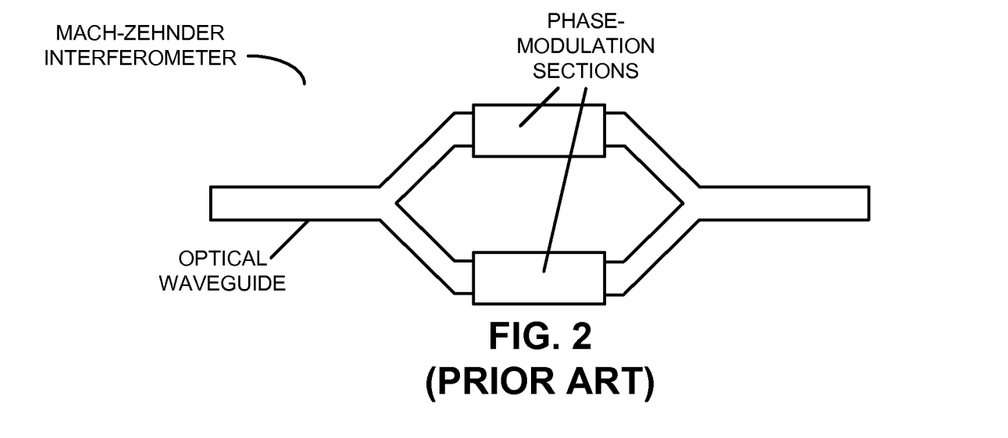
FIG. 2 is a block diagram illustrating an existing Mach-Zehnder interferometer (MZI).

A high-speed optical modulator is an important component in a silicon photonic link. The function of an optical modulator is to convert a high-speed electrical data signal into optical form. The basic requirements of such an optical modulator are: high speed, low power consumption, low optical loss, a high on/off extinction ratio (ER), and compact size. To date, most of the reported high-speed optical modulators implemented using silicon are based on the free-carrier plasma dispersion effect, i.e., the index of refraction of silicon decreases as densities of electrons and holes (i.e., free carriers) increase. In order to use the free-carrier plasma dispersion effect for data modulation, the carrier densities in an optical waveguide need to be modulated. Thus, the index of refraction is modulated, and the optical phase of propagating laser light is modulated. As shown in FIGS. 1 and 2, the phase modulation can then be converted into optical intensity modulation (i.e., on/off switching) by building the phase-modulation optical waveguide into a ring-resonator modulator or a Mach-Zehnder interferometer (MZI).

Ring-resonator modulators typically use strong resonances for modulation. Consequently, they can achieve a large ER even with weak phase modulation. However, ring-resonator modulators usually require precise and dynamic tuning to align the resonance with the laser wavelength. This tuning can consume a large amount of electrical power and may require a large area for control circuits, which can significantly increase the cost of the ring-resonator modulators. Alternatively, MZIs usually do not require precise and dynamic tuning. However, they usually need much stronger phase modulation in order to achieve a large ER. An ideal modulator would be an MZI having a short length with strong phase modulation in the optical waveguide.

A variety of techniques are currently used to electrically modulate the carrier densities in the phase-modulation optical waveguides, including: carrier injection, carrier depletion and carrier accumulation. In carrier-injection phase modulation, high densities of free carriers are injected into the intrinsic region of a forward-biased PIN diode using a relatively small voltage (approximately, 1V). While this modulation technique is very efficient, its speed is typically limited to around 1 Gb/s by minority-carrier diffusion.

In carrier-depletion phase modulation, the carrier-depletion region of a reverse-biased PN diode is modulated. Because this modulation technique does not involve minority-carrier diffusion, it can be very fast. However, carrier-depletion modulation is often inefficient because it is hard to deplete a lot of charge. Consequently, for efficient modulation, carrier-depletion modulation is typically implemented in a ring-resonator modulator or an MZI having a long length. Therefore, phase modulation based on carrier injection or carrier depletion usually cannot simultaneously produce a high-speed (greater than 10 Gb/s), very short MZI (less than 0.3 mm) with a reasonably large ER (greater than 5 dB) under small voltage modulation (less than 2V).

Carrier-accumulation phase modulation attempts to combine the advantages of carrier-injection phase modulation and carrier-depletion phase modulation. In this technique, a diode with a forward-biased PN junction having a very thin (less than 10 nm) oxide barrier layer (which prevents minority-carrier diffusion) is used. Under forward-biased voltage, the diode operates in an accumulation mode, in which large densities of carriers accumulate at the two sides of the oxide layer. This approach is usually much more efficient than carrier-depletion phase modulation, but is typically less efficient than carrier-injection phase modulation. Using carrier-accumulation phase modulation, it is possible to build a short MZI (around 0.5 mm) with high carrier-mobility and low voltage operation. However, the diode typically has much higher optical loss (greater than 100 dB/cm) than the PN diodes (less than 10 dB/cm) because of polycrystalline-silicon scattering and absorption. Consequently, the resulting modulator may have higher optical loss even though its length is much shorter (approximately 6×). In addition, the diode typically has a very high unit capacitance, which prohibits traveling-wave design and limits modulation speed (because of RC limits associated with the MZI and driver). In order to achieve greater than 10 Gb/s with a lumped-element design, it is important to lower the capacitance of the MZI to less than 0.5 pF, while maintaining high efficiency.

Hence, what is needed is an optical modulator without the problems described above.

SUMMARY

One embodiment of the present disclosure provides an integrated circuit that includes: a first semiconductor layer, an oxide layer disposed on a portion of the first semiconductor layer; and a second semiconductor layer, disposed on the oxide layer, which defines a semiconductor-oxide-semiconductor diode. Moreover, the semiconductor-oxide-semiconductor diode is included in an optical waveguide that conveys an optical signal, and the first semiconductor layer and the second semiconductor layer include electrical contacts that impart an electric potential across the semiconductor-oxide-semiconductor diode. Furthermore, the first semiconductor layer and the second semiconductor layer include geometric features that create a lattice-shifted photonic crystal optical waveguide having a group velocity of light that is lower than the group velocity of light in the first semiconductor layer and the second semiconductor layer without the geometric features.

Note that the integrated circuit includes: a substrate, a buried-oxide layer disposed on the substrate, and the first semiconductor layer disposed on the buried-oxide layer. For example, the substrate, the buried-oxide layer and the first semiconductor layer may comprise a silicon-on-insulator technology.

In some embodiments, the first semiconductor layer includes silicon and the second semiconductor layer includes polycrystalline silicon.

Additionally, the geometric features may include a periodic pattern of holes and/or a periodic pattern of trenches.

The optical waveguide may have two arms that form an optical modulator. For example, the optical modulator may include a Mach-Zehnder interferometer (MZI).

Another embodiment provides a system that includes the integrated circuit.

Another embodiment provides a method for conveying an optical signal. During the method, the electric potential is applied across the semiconductor-oxide-semiconductor diode defined by a region of overlap of the first semiconductor layer, the oxide layer and the second semiconductor layer. Then, the optical signal is conveyed through the optical waveguide that includes the semiconductor-oxide-semiconductor diode, where the first semiconductor layer and the second semiconductor layer include the geometric features that create the lattice-shifted photonic crystal optical waveguide having a group velocity of light that is lower than the group velocity of light in the first semiconductor layer and the second semiconductor layer without the geometric features.

Another embodiment provides another integrated circuit. This other integrated circuit includes: a first semiconductor layer; a dielectric layer, disposed on a portion of the first semiconductor layer, having a dielectric constant greater than that of silicon dioxide; and a second semiconductor layer, disposed on the dielectric layer, to define a semiconductor-dielectric-semiconductor diode, where the semiconductor-dielectric-semiconductor diode is included in an optical waveguide that conveys an optical signal. Moreover, the first semiconductor layer and the second semiconductor layer include electrical contacts that impart an electric potential across the semiconductor-dielectric-semiconductor diode. For example, the first semiconductor layer may include polysilicon and the second semiconductor layer may include silicon.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a photonic integrated circuit (PIC), a system that includes the PIC, and a method for conveying an optical signal are described. This PIC includes a semiconductor-oxide-semiconductor diode in an optical waveguide that conveys an optical signal. Moreover, semiconductor layers in the semiconductor-oxide-semiconductor diode include geometric features (such as a periodic pattern of holes or trenches) that create a lattice-shifted photonic crystal optical waveguide having a group velocity of light that is lower than the group velocity of light in the first semiconductor layer and the second semiconductor layer without the geometric features. The optical waveguide is included in an optical modulator, such as a Mach-Zehnder interferometer (MZI).

By using slow light to enhance the semiconductor-oxide-semiconductor diode, the performance of the optical modulator can be significantly increased. For example, the effective interaction length and, thus, the modulation efficiency may be increased by 3-10×. This may allow the length of the optical modulator to be reduced (e.g., to less than 0.2 mm), while providing a wide optical bandwidth (15-20 nm) with acceptable optical loss. In this way, the modulation technique may provide the benefits of a resonant optical modulator (such as a ring-resonator modulator) without disadvantages.

Figure 3:
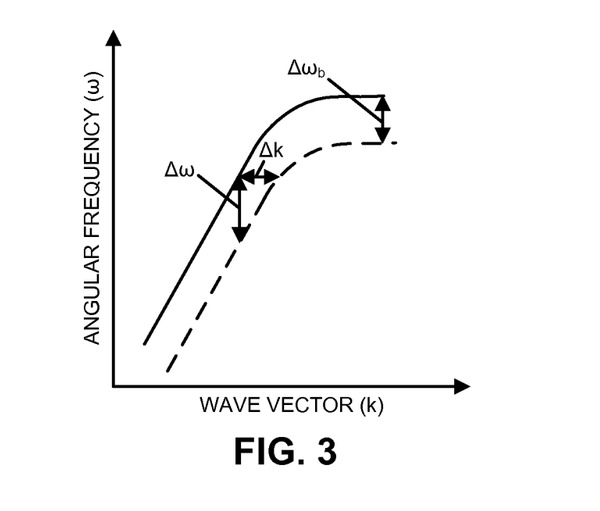
FIG. 3 is a drawing illustrating photon energy as a function of wave vector in an optical waveguide in accordance with an embodiment of the present disclosure.

We now describe embodiments of the PIC (which is sometimes referred to as a 'chip'). As described further below with reference to FIGS. 5 and 6, in this PIC a so-called 'slow-light' structure having periodic gratings in an optical waveguide (such as a periodic pattern of holes or trenches) is used to create a photonic bandgap. As shown in FIG. 3, which presents a drawing illustrating photon energy (as indicated by the angular frequency $\omega$) as a function of wave vector (k) in an optical waveguide, at the photonic band edge the propagating light has very slow group velocity (or a large group-velocity index of refraction $n_g$). This slow group velocity enhances the modulation of the light. In particular, when the optical waveguide is being modulated (e.g., as described further below with reference to FIG. 4, by applying an electric potential to the optical waveguide), the refractive index of part of the material in the optical waveguide changes by $\Delta n$ (note that $n_g$ is for the optical waveguide not the material). This modulation shifts the band edge of the photonic bandgap down (from the solid line to the dashed line in FIG. 3) and results in a change of the wave vector $\Delta k$ for the light propagating in the optical waveguide. By definition, the slope of the $\omega(k)$ curve in FIG. 3 is the group velocity. Therefore, $$\Delta k = \frac{n_g}{c} \cdot \Delta \omega, \qquad (1)$$

where c is the speed of light and $\Delta w$ is the change in the angular frequency. Furthermore, when the optical wavelength is near to the photonic band edge, $\Delta \omega$ equals the band-edge shift $\Delta \omega_b$. Consequently, $$\Delta k = \frac{n_g}{c} \cdot \Delta\omega \approx \frac{n_g}{c} \cdot \Delta\omega_b = \frac{n_g}{c} \cdot \frac{\partial\omega_b}{\partial n} \cdot \Delta n, \quad (2)$$

where $$\frac{\partial\omega_b}{\partial n}$$

is the partial derivative of the band edge as a function of the index of refraction associated with the modulation. The phase modulation $\Delta\phi$ of the light propagating in such a slow-light optical waveguide having a length L is $$\Delta\varphi = \Delta k \cdot L \approx \frac{n_g}{c} \cdot \frac{\partial\omega_b}{\partial n} \cdot \Delta n \cdot L. \quad (3)$$

Figure 5:
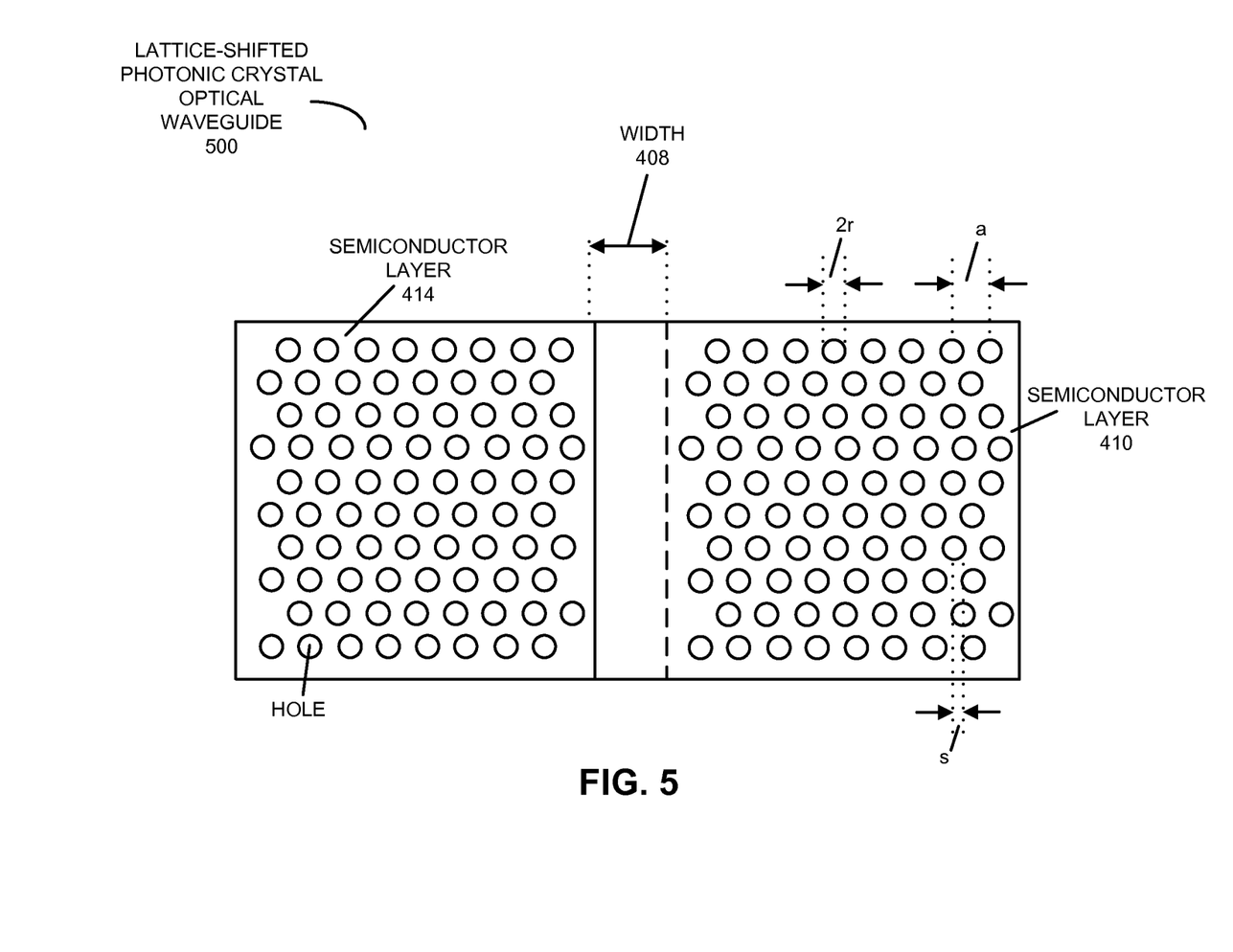
FIG. 5 is a block diagram illustrating a top view of a lattice-shifted photonic crystal optical waveguide in accordance with an embodiment of the present disclosure.
Figure 6:
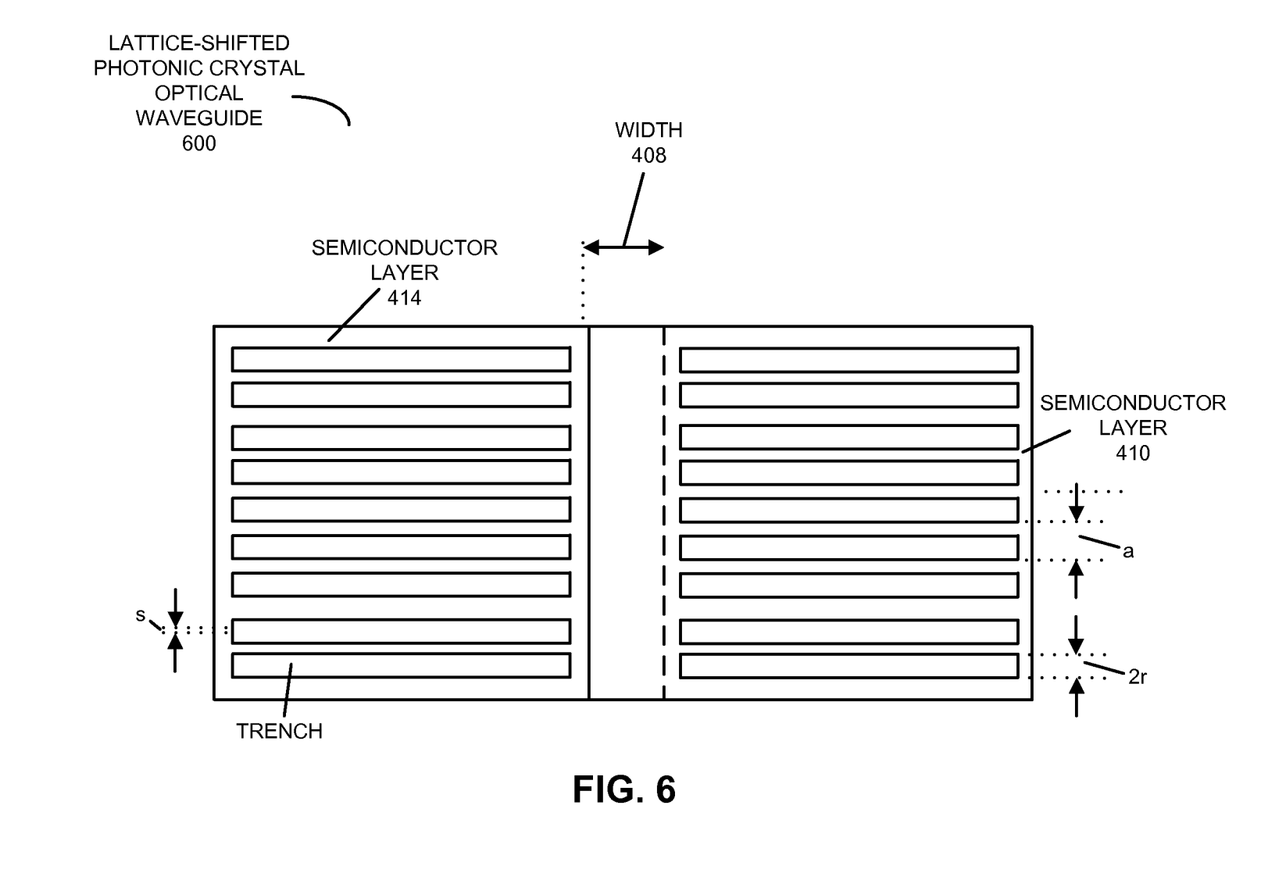
FIG. 6 is a block diagram illustrating a top view of a lattice-shifted photonic crystal optical waveguide in accordance with an embodiment of the present disclosure.

The preceding analysis indicates that the phase modulation $\Delta\phi$ is roughly proportional to $n_g$. A regular silicon-on-insulator (SOI) rib optical waveguide has an $n_g$ of around 4, while a slow-light optical waveguide can have an $n_{g,of}$ up to 100 when the optical wavelength is close to the band edge. However, in the process the optical wavelength range can be greatly reduced. Moreover, the loss per unit length can be large in this regime. Furthermore, an $n_g$ of greater than 40 may only occur within a very small wavelength range (e.g., 1577 nm-1580 nm). As shown in FIGS. 5 and 6, to address these challenges a lattice-shifted photonic crystal is used in the slow-light optical waveguide.

Figure 4:
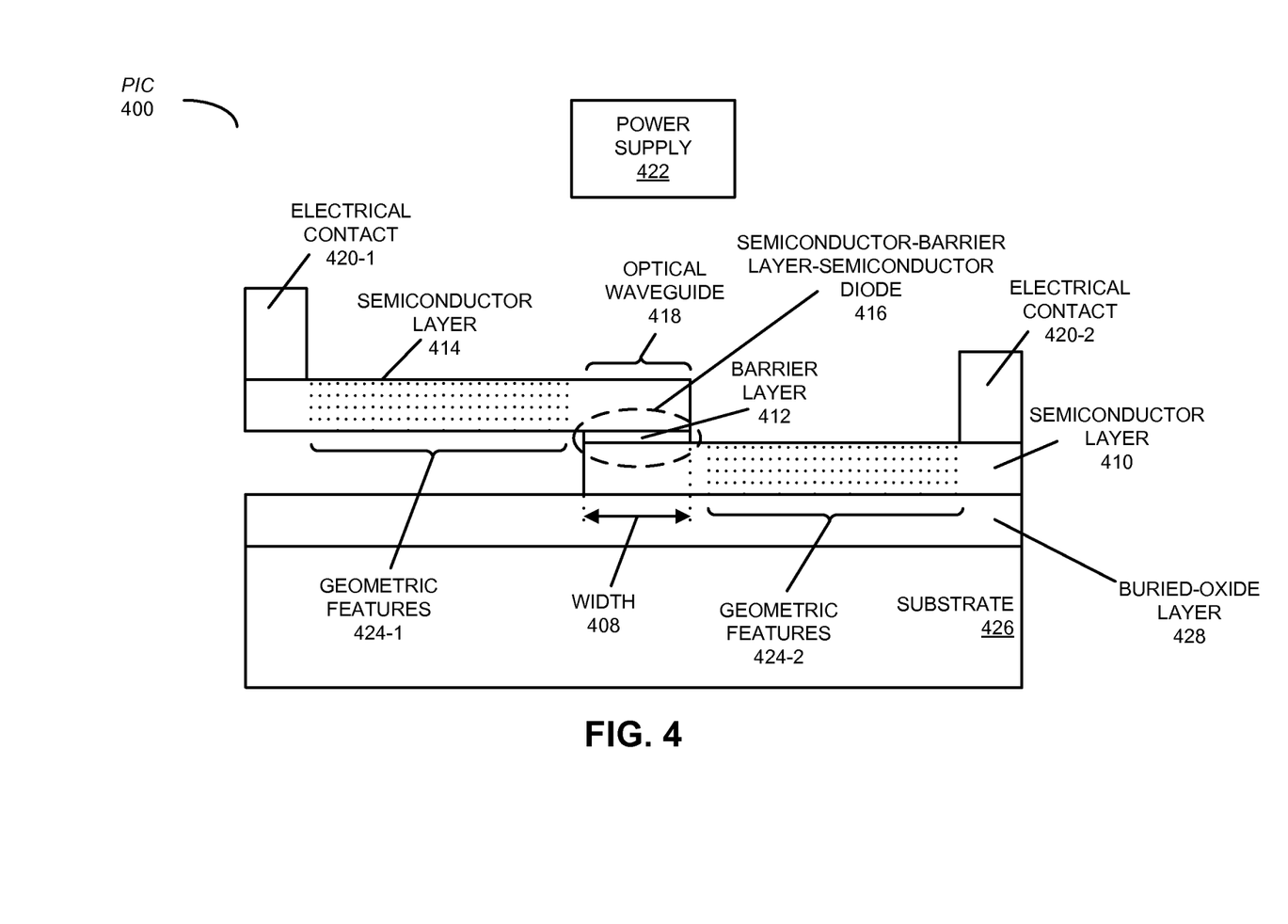
FIG. 4 is a block diagram illustrating a side view of a photonic integrated circuit (PIC) in accordance with an embodiment of the present disclosure.

FIG. 4 presents a block diagram illustrating a side view of a PIC 400. This PIC includes: a semiconductor layer 410; a barrier layer 412 (such as an oxide) disposed on a portion or width 408 of semiconductor layer 410; and a semiconductor layer 414, disposed on barrier layer 412, which defines a semiconductor-barrier layer-semiconductor diode 416. Moreover, semiconductor-barrier layer-semiconductor diode 416 is included in an optical waveguide 418 that conveys an optical signal, and semiconductor layer 410 and semiconductor layer 414 include electrical contacts 420 that impart an electric potential (e.g., 1-3 V DC), provided by power supply 422, across semiconductor-barrier layer-semiconductor diode 416. Furthermore, semiconductor layer 410 and/or semiconductor layer 414 include geometric features 424 that create a lattice-shifted photonic crystal optical waveguide having a group velocity of light that is lower than the group velocity of light in semiconductor layer 410 and/or semiconductor layer 414 without geometric features 424.

In some embodiments, PIC 400 includes substrate 426, and a buried-oxide layer 428 disposed on substrate 426. Moreover, semiconductor layer 410 may be disposed on buried-oxide layer 428. Substrate 426, buried-oxide layer 428 and semiconductor layer 410 may comprise a silicon-on-insulator technology. Thus, substrate 426 and semiconductor layer 410 may include silicon. Note that semiconductor layer 410 may have a thickness that is less than 2 μm (such as 0.2-0.3 μm), and buried-oxide layer 428 may have a thickness between 0.3 and 3 μm (such as 0.8 μm).

In an exemplary embodiment, semiconductor layer 410 includes n-type silicon and semiconductor layer 414 includes p-type polycrystalline silicon. Alternatively, semiconductor layer 410 may include p-type silicon and semiconductor layer 414 may include n-type polycrystalline silicon.

Semiconductor-barrier layer-semiconductor diode 416 may be designed for high efficiency and low capacitance. The configuration shown in FIG. 4 may provide easy connection to electrical contacts 420 and tight optical confinement. Semiconductor layer 410 and semiconductor layer 414 may have the same thickness (e.g., 100-200 nm) so that the center of the optical mode of the optical signal can overlap with the carriers accumulated around (gate) barrier layer 412. Moreover, width 408 (e.g., 200 nm) and a height of optical waveguide 418 may be selected to make the optical mode as small as possible. The thickness ($t_{ox}$) of barrier layer 412 may be thin (e.g., 10 nm) for a large modulation efficiency (and, thus, a short device length and reduced optical loss), but the total device capacitance may be independent of $t_{ox}$. As described further below with reference to FIG. 7, the capacitance may be less than 0.5 pF in optical waveguides having a length of 0.5 mm in each arm of an MZI.

A variety of geometric features 424 may be used to implement the lattice-shifted photonic crystal optical waveguide. This is illustrated in FIG. 5, which presents a block diagram illustrating a top view of a lattice-shifted photonic crystal optical waveguide 500 (with a lattice shift of s for every seventh row), and FIG. 6, which presents a block diagram illustrating a top view of a lattice-shifted photonic crystal optical waveguide 600 (with a lattice shift of s for every fifth row). In particular, geometric features 424 (FIG. 4) may include a periodic pattern of holes (such as a two-dimensional array of holes filled with silicon dioxide) and/or a periodic pattern of trenches (such as a one-dimensional array of trenches filled with silicon dioxide). Note that geometric features 424 (FIG. 4) may extend partially or completely through the thicknesses of semiconductor layer 410 and/or semiconductor layer 414 (FIG. 4) in order to create the slow-light effect.

In an exemplary embodiment, the lattice-shifted photonic crystal has an $n_g$ of at least 20 over a 15-20 nm wavelength band that is achieved by shifting a row of lattices by 95 nm. For example, in FIG. 5, a may be 400 nm and 2r may be 215 nm. Note that the holes and/or trenches can further reduce the optical mode size, thereby increasing the modulation efficiency and reducing the device capacitance. Moreover, by incorporating a perturbation to the periodic structure of geometric features 424 (FIG. 4), the wavelength band can be greater than 15 nm.

Optical waveguide 418 (FIG. 4) may offer more than a 3× enhancement to the modulation. Consequently, the modulation length may be reduced by 3× to less than 0.2 mm. (Alternatively, the modulation length may be unchanged, but the electric potential may be reduced to reduce power consumption.) Moreover, the capacitance may be lowered by 3×, which may allow modulation at greater than 40 Gb/s. Furthermore, the extinction ratio (ER) may be greater than 7 dB under small-voltage modulation (an electric potential less than 2V). While the optical propagation loss may be high (up to 150 dB/cm), the total optical loss can be less than 3 dB with a modulation length less than 0.2 mm.

Figure 7:
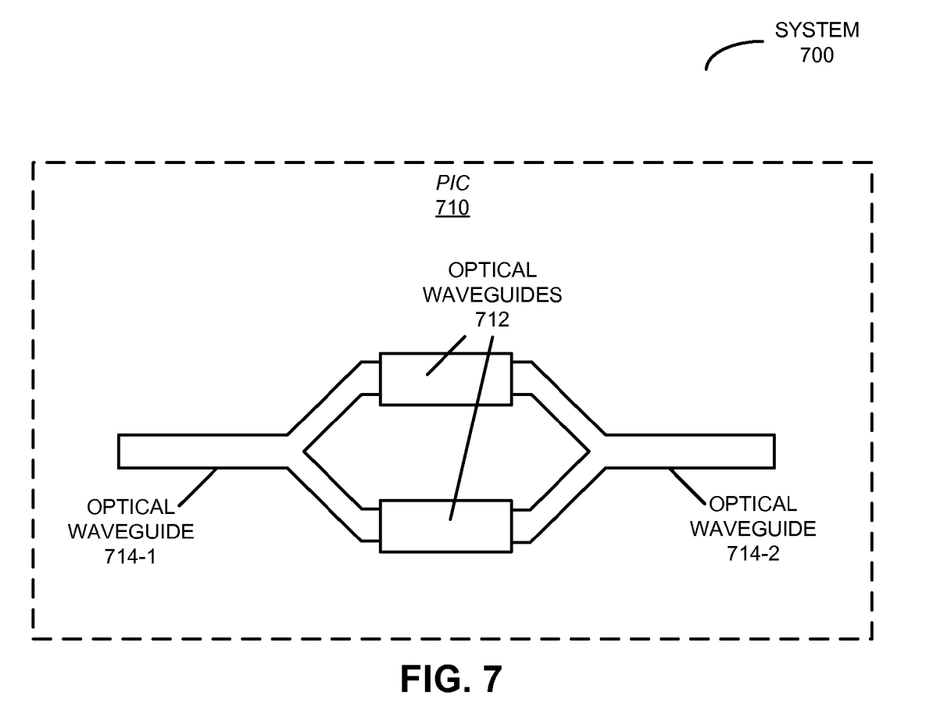
FIG. 7 is a block diagram illustrating a system that includes the PIC of FIG. 4 in accordance with an embodiment of the present disclosure.

We now describe the system. FIG. 7 presents a block diagram illustrating a system 700 that includes a PIC 710 (such as PIC 400 in FIG. 4) with optical waveguides 712 (such as two instances of optical waveguide 418 in FIG. 4) that form two arms of an optical modulator (and, in particular, phase-modulation sections). For example, the optical modulator may include an MZI. The total optical loss of the MZI, including the optical coupling loss between optical waveguides 714 and the slow-light-enhanced optical waveguides 712, can be less than 5 dB.

Note that system 700 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. In some embodiments, the computer system may be at one location or may be distributed over multiple, geographically dispersed locations.

Moreover, the preceding embodiments of the PIC and/or the system may include fewer components or additional components. Moreover, the substrates may include: a semiconductor die (such as silicon), a ceramic, an organic material and/or glass.

Although the PICs and the system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. In addition, functionality in the preceding embodiments may be implemented more in hardware and less in software, or less in hardware and more in software, as is known in the art.

Note that components in the preceding embodiments of the PIC and the system may be fabricated using a wide variety of techniques, as is known to one of skill in the art, including silicon-machining techniques, such as wet etching and dry etching.

Figure 8:
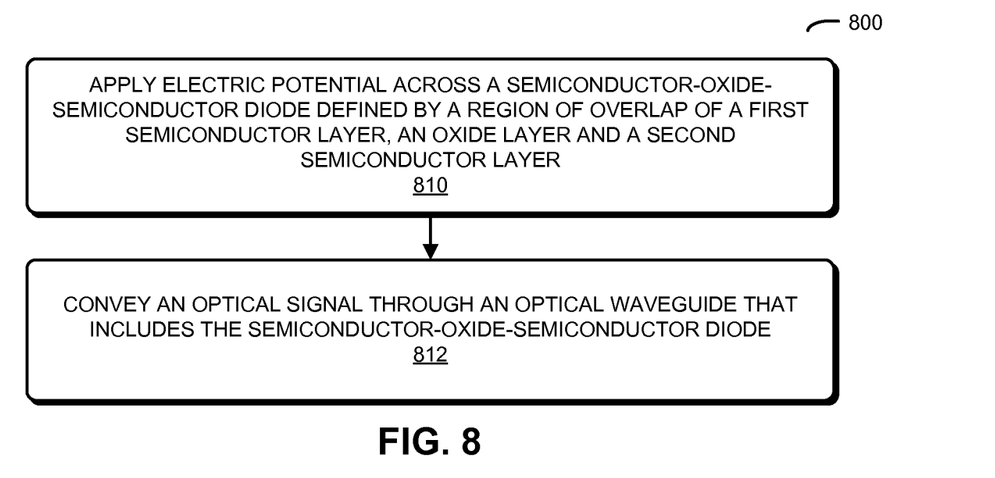
FIG. 8 is a flow diagram illustrating a method for conveying an optical signal in accordance with an embodiment of the present disclosure.

We now describe the method. FIG. 8 presents a flow diagram illustrating a method 800 for conveying an optical signal, which may be performed by a PIC, such as PIC 400 (FIG. 4). During this method, an electric potential is applied across a semiconductor-oxide-semiconductor diode defined by a region of overlap of a first semiconductor layer, an oxide layer and a second semiconductor layer (operation 810). Then, the optical signal is conveyed through an optical waveguide that includes the semiconductor-oxide-semiconductor diode (operation 812), where the first semiconductor layer and the second semiconductor layer include geometric features that create a lattice-shifted photonic crystal optical waveguide having a group velocity of light that is lower than the group velocity of light in the first semiconductor layer and the second semiconductor layer without the geometric features.

In some embodiments of method 800, there may be additional or fewer operations. Moreover, the order of the operations may be changed, and/or two or more operations may be combined into a single operation.

We now describe another optical-modulator structure (which is similar to PIC 400 in FIG. 4) that includes metal-oxide-semiconductor (MOS) diodes with high-k dielectric materials. The high-k dielectric material in these optical modulators can improve the modulation efficiency by more than 10×, thereby greatly reducing the footprint of the optical modulator and the optical loss (by greater than 5 dB). This optical-modulator structure may allow the design of a very short (less than 50 μm) MZI modulator, and may achieve an ER of greater than 7 dB with a data rate of 10 Gb/s using 1 V modulation or a data rate of 25 Gb/s using 2 V modulation.

Modulation techniques such as carrier injection, carrier depletion and carrier accumulation are based on the same free-carrier dispersion effect. In particular, free carriers, including electrons and holes, absorb optical power in the silicon optical waveguides, which in turn induces a change in the optical index of refraction in silicon because of the Kromers-Kronig relationship. The change in absorption coefficient is linearly proportional to the change of the free carrier densities ($N_e$ and $N_h$), i.e., $$\Delta\alpha = \sigma_e N_e + \sigma_h N_h,$$

where $\sigma_e$ and $\sigma_h$ are so-called 'absorption cross-sections.' In the Drude model of electrical conduction $$\sigma_e = \frac{e^3 \lambda^2}{4\pi^2 c^3 \varepsilon_0 n_0 m_e^2 \mu_e} \text{ and } \sigma_h = \frac{e^3 \lambda^2}{4\pi^2 c^3 \varepsilon_0 n_0 m_h^2 \mu_h},$$

where e is the electron charge, $\lambda$ is the optical wavelength, c is the light speed in vacuum, $\in_0$ is permittivity in vacuum, $n_0$ is the refractive index of silicon, $m_e$ and $m_h$ are the effective masses of electrons and holes, and $\mu_e$ and $\mu_h$ are the mobilities of the electron and hole carriers in silicon. At a wavelength of 1550 nm, $\sigma_e$ and $\sigma_h$ in silicon are $8.5 \times 10^{-18}$ cm$^2$ and $6 \times 10^{-18}$ cm$^2$, respectively, and the change in the absorption coefficient and the index of refraction empirically follow $$\Delta\alpha = 8.5 \cdot 10^{-18} \cdot N_e + 6 \cdot 10^{-18} \cdot N_h$$

and $$\Delta n = -8.8 \cdot 10^{-22} \cdot N_e - 8.5 \cdot 10^{-18} \cdot N_h^{0.8}.$$

For simplicity, consider $\Delta n$ to be linearly proportional to the change of the free carrier densities $N_e$ and $N_h$. In a MOS diode under forward bias, an equal number of free electrons and holes (density change $\Delta N$) accumulate in a small area (A) at the two sides of the oxide layer. The optical mode in this small area is approximately uniform, with a mode density of M. Consequently, the optical confinement factor in this area is M·A. The change of the effective index of refraction of the mode can be approximately calculated as $$\Delta n_{\mathit{eff}} \approx \Delta n \cdot M \cdot A \approx \eta \cdot \Delta N \cdot M \cdot A,$$

where $\eta$ (equal to $\eta_e$ plus $\eta_h$) is the coefficient relating the index of refraction change $\Delta n$ to the carrier-density change $\Delta N$. The phase change for a modulation optical waveguide with length L is $$\Delta\phi = \frac{2\pi}{\lambda} \cdot \Delta n_{\mathit{eff}} \cdot L \approx \frac{2\pi}{\lambda} \cdot \eta \cdot \Delta N \cdot M \cdot A \cdot L \approx$$

$$\frac{2\pi}{\lambda \cdot e} \cdot \eta \cdot M \cdot \Delta Q \approx \frac{2\pi}{\lambda \cdot e} \cdot \eta \cdot M \cdot C \cdot \Delta V.$$

This last equation indicates that the phase change is linearly proportional to the change of the accumulated charge ($\Delta Q$ equals $\Delta N \cdot A \cdot L \cdot e$) in the whole optical waveguide, which makes it proportional to the total diode capacitance (C) and the voltage swing ($\Delta V$). The capacitance C can be further expanded as $\in_0 \cdot \in_r \cdot W \cdot L / t_{ox}$, where $\in_0$ is the permittivity in vacuum, $\in_r$ is the dielectric constant in the oxide layer, W is the optical waveguide width, and $t_{ox}$ is the oxide thickness. Therefore, the phase change is $$\Delta\phi \approx \frac{2\pi \cdot \eta \cdot M \cdot \varepsilon_0 \cdot \varepsilon_r \cdot W \cdot L \cdot \Delta V}{\lambda \cdot e \cdot t_{ox}}.$$

A popular device metric $V_\pi L$ is defined as $\Delta V \cdot L$ when $\Delta\phi$ equals $\pi$, i.e., $$V_\pi L \approx \frac{\lambda \cdot e \cdot t_{ox}}{2 \cdot \eta \cdot M \cdot \varepsilon_0 \cdot \varepsilon_r \cdot W}.$$

With push-pull modulation, a phase change of $\pi/4$ on each MZI arm ($\pi/2$ from two arms) is typically needed to achieve an ER of approximately 7 dB (with 1.5 dB extra loss in the ON state). If the voltage swing is 2V, the modulation length may need to be $V_\pi \cdot L/8$. The preceding expressions for the phase change indicate some important design principles for this type of MZI modulator. In particular, the optical-mode density M may be maximized around the oxide area. Increasing M can reduce the device length L and the required charge $\Delta Q$ equal to $C \cdot \Delta V$ (allowing a reduction in C or $\Delta V$). In order to maximize M, the optical mode may be made as compact as possible. Furthermore, increasing the coefficient $\eta$ may offer similar benefits to maximizing M. Based on the Drude model of conduction, larger $\eta$ can be achieved by using a material with lower mobilities (such as indium-tin-oxide, amorphous silicon, etc). In addition, although a thinner oxide (smaller $t_{ox}$) can reduce $V_\pi L$ (and, thus, can be used to make a shorter device with smaller optical loss), it may not reduce the required charge $\Delta Q$ equal to $C \cdot \Delta V$. Therefore, a thinner oxide usually cannot reduce the voltage swing without increasing the capacitance.

With silicon dioxide as the oxide layer in the middle of the MOS diode (such as barrier layer 412 in FIG. 4), a $V_\pi L$ of 0.2 V-cm can be achieved (for example, with an optical waveguide optimized for maximum mode density M, and with a thin $t_{ox}$ of 2-5 nm). With a 1 V swing on both MZI arms under push-pull modulation, this design may use a 500-μm long modulation length. However, this design can be improved by replacing the silicon dioxide with a high-k dielectric material in the middle of the MOS diode. An exemplary structure follows that shown in FIG. 4 (with or without features 424). In particular, a top polysilicon layer and a bottom silicon layer (for example, p-type polysilicon on n-type silicon or n-type polysilicon on p-type silicon) can have the same thickness so that the center of the optical mode can overlap with the carriers accumulated around the high-k dielectric layer. The high-k material can have much larger dielectric constant ($\varepsilon_r$ greater than 100) than silicon dioxide ($\varepsilon_r$ equal to 3.9). The preceding expression for VI indicates that the large $\varepsilon_r$ results in more than a 10× reduction in $V_\pi L$. (In addition, simulations indicate that: with an $\varepsilon_r$ equal to 3.9, $V_\pi L$ equals approximately 0.2 V-cm; with an $\varepsilon_r$ equal to 100, $V_\pi L$ equals approximately 0.0078 V-cm; and with an $\varepsilon_r$ equal to 500, $V_\pi L$ equals approximately 0.00156 V-cm.) This may allow a very short (less than 50 μm) MZI modulator to be designed, and to achieve a data rate of 10 Gb/s under 1 V modulation. Moreover, based on the preceding expression for the phase change, with 2 V modulation the device capacitance may be cut to half (by either halving L or doubling $t_{ox}$) while maintaining the same phase shift. This may allow modulation at a data rate of 25 Gb/s with an ER of greater than 7 dB. Because the MOS optical waveguide is typically very lossy (greater than 100 dB/cm), the shortened MZI can lower the optical loss by more than 5 dB.

Based on the preceding analysis, increasing $\varepsilon_r$ by more than 10× can result in the same effect as reducing $t_{ox}$ by more than 10× (although reducing $t_{ox}$ to less than 0.2 nm is typically very difficult). However, it usually cannot reduce the required charge $\Delta Q$ equal to $C \cdot \Delta V$ and, thus, may not improve the device speed. In order to achieve higher speed (such as 40 Gb/s) with a large ER (greater than 7 dB) and a small voltage swing (less than 2 V), a high-k material can be combined with a low-mobility material (such as indium-tin-oxide or amorphous silicon). For example, a thin layer of low-mobility material can be deposited affinitive to a high-k material layer, thus requiring less charge ($\Delta Q$) for the same phase shift. These two layers may increase the efficiency by more than 100×, thus even a high-speed electro-absorption (EA) modulator may be possible (e.g., the resulting $\Delta\alpha$ may be high enough that the modulator does not need to use index change, thus eliminating the MZI structure).

Note that this modulation architecture can also be applied to plasmonic optical-waveguide modulators, which include a horizontal metal-oxide-silicon-oxide-metal plasmonic optical waveguide. Such an optical waveguide may have very small dimension (approximately 50 nm) and may have an optical mode that is highly concentrated around the oxide region because of the plasmonic effect. Consequently, its modulation efficiency can be extremely high. An EA modulator employing a modulation optical waveguide that is 4 μm long can achieve an ER of 3 dB under approximately a 3 V swing, and with very small capacitance (approximately 16 fF). Using a longer modulation length can increase ER and can reduce the modulation voltage, but it may increase optical loss because the propagation loss may be very high (approximately 1 dB/μm) in such an optical waveguide. However, by replacing the thin oxide layer with high-k dielectric material, the ER can be greatly increased and the modulation voltage can be reduced without increasing optical loss. While the capacitance may be increased, its effect can be neglected at up to 40 Gb/s.

Note that high-k dielectric materials are available in standard CMOS processes, and the dielectric constant will likely be continuously increased. High-k materials such as zirconium dioxide, hafnium dioxide and tantalum dioxide are already available, with dielectric constants of 25-26. In addition, other high-k materials (such as titanium dioxide, strontium titanate and barium strontium titanate), with dielectric constants of 50 to a few hundred, will be available in CMOS processes the near future.

Thus, the optical-modulator structure described above can improve the modulation efficiency by more than 10×, thereby greatly reducing the device footprint and optical loss (by greater than 5 dB). This may facilitate the design of a very short (less than 50 μm) MZI modulator, and a data rate of 10 Gb/s under 1 V modulation or a data rate of 25 Gb/s under 2 V modulation, both with a large ER of more than 7 dB. In conjunction with low-mobility materials, 40 Gb/s MZI modulators or even high-speed EA modulators may be possible. By applying the optical-modulator structure to a plasmonic optical-waveguide modulator, a high speed (40 Gb/s) EA modulator with a few μm length can be realized with a high ER (greater than 10 dB) and low loss (less than 2 dB) under small voltage (approximately 1 V) modulation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
   a first semiconductor layer;
   an oxide layer disposed on a portion of the first semiconductor layer; and
   a second semiconductor layer, disposed on the oxide layer, to define a semiconductor-oxide-semiconductor diode, wherein the semiconductor-oxide-semiconductor diode is included in an optical waveguide configured to convey an optical signal;
   wherein the first semiconductor layer and the second semiconductor layer include electrical contacts configured to impart an electric potential across the semiconductor-oxide-semiconductor diode; and
   wherein the first semiconductor layer and the second semiconductor layer include geometric features that create a lattice-shifted photonic crystal optical waveguide having a group velocity of light that is lower than the group velocity of light in the first semiconductor layer and the second semiconductor layer without the geometric features, wherein the geometric features include a perturbation to a periodic pattern of geometric features, wherein the perturbation to the periodic pattern results in a non-periodic pattern of geometric features that is caused by a shift in at least one row of lattices.

2. The integrated circuit of claim 1, wherein the integrated circuit includes:
   a substrate; and
   a buried-oxide layer disposed on the substrate; and
   wherein the first semiconductor layer is disposed on the buried-oxide layer.

3. The integrated circuit of claim 2, wherein the substrate, the buried-oxide layer and the first semiconductor layer comprise a silicon-on-insulator technology.

4. The integrated circuit of claim 1, wherein the first semiconductor layer includes silicon and the second semiconductor layer includes polycrystalline silicon.

5. The integrated circuit of claim 1, wherein the periodic pattern of geometric features include one of: a periodic pattern of holes and a periodic pattern of trenches.

6. The integrated circuit of claim 1, wherein the optical waveguide has two arms that form an optical modulator.

7. The integrated circuit of claim 6, wherein the optical modulator includes a Mach-Zehnder interferometer (MZI).

8. A system, comprising an integrated circuit, wherein the integrated circuit includes:
   a first semiconductor layer;
   an oxide layer disposed on a portion of the first semiconductor layer; and
   a second semiconductor layer, disposed on the oxide layer, to define a semiconductor-oxide-semiconductor diode, wherein the semiconductor-oxide-semiconductor diode is included in an optical waveguide configured to convey an optical signal;
   wherein the first semiconductor layer and the second semiconductor layer include electrical contacts configured to impart an electric potential across the semiconductor-oxide-semiconductor diode; and
   wherein the first semiconductor layer and the second semiconductor layer include geometric features that create a lattice-shifted photonic crystal optical waveguide having a group velocity of light that is lower than the group velocity of light in the first semiconductor layer and the second semiconductor layer without the geometric features, wherein the geometric features include a perturbation to a periodic pattern of geometric features, and wherein the perturbation to the periodic pattern results in a non-periodic pattern of geometric features that is caused by a shift in at least one row of lattices.

9. The system of claim 8, wherein the integrated circuit includes:
   a substrate; and
   a buried-oxide layer disposed on the substrate; and
   wherein the first semiconductor layer is disposed on the buried-oxide layer.

10. The system of claim 9, wherein the substrate, the buried-oxide layer and the first semiconductor layer comprise a silicon-on-insulator technology.

11. The system of claim 8, wherein the first semiconductor layer includes silicon and the second semiconductor layer includes polycrystalline silicon.

12. The system of claim 8, wherein the periodic pattern of geometric features include one of: a periodic pattern of holes and a periodic pattern of trenches.

13. The system of claim 8, wherein the optical waveguide has two arms that form an optical modulator.

14. The system of claim 13, wherein the optical modulator includes a Mach-Zehnder interferometer (MZI).

15. A method for conveying propagation of an optical signal, the method comprising:
   applying an electric potential across a semiconductor-oxide-semiconductor diode defined by a region of overlap of a first semiconductor layer, an oxide layer and a second semiconductor layer; and
   conveying the optical signal through an optical waveguide that includes the semiconductor-oxide-semiconductor diode, wherein the first semiconductor layer and the second semiconductor layer include geometric features that create a lattice-shifted photonic crystal optical waveguide having a group velocity of light that is lower than the group velocity of light in the first semiconductor layer and the second semiconductor layer without the geometric features, wherein the geometric features include a perturbation to a periodic pattern of geometric features, and wherein the perturbation to the periodic pattern results in a non-periodic pattern of geometric features that is caused by a shift in at least one row of lattices.

16. The method of claim 15, wherein the first semiconductor layer is disposed on a buried-oxide layer;
   wherein the buried-oxide layer is disposed on a substrate; and
   wherein the substrate, the buried-oxide layer and the first semiconductor layer comprise a silicon-on-insulator technology.

17. The method of claim 15, wherein the first semiconductor layer includes silicon and the second semiconductor layer includes polycrystalline silicon.

18. The method of claim 15, wherein the periodic pattern of geometric features include one of: a periodic pattern of holes and a periodic pattern of trenches.

19. The method of claim 15, wherein the optical waveguide has two arms that form an optical modulator.

20. The method of claim 19, wherein the optical modulator includes a Mach-Zehnder interferometer (MZI).

21. An integrated circuit, comprising:
a first semiconductor layer;
 an oxide layer disposed on a portion of the first semiconductor layer; and
 a second semiconductor layer, disposed on the oxide layer, to define a semiconductor-oxide-semiconductor diode, wherein the semiconductor-oxide-semiconductor diode is included in an optical waveguide configured to convey an optical signal, wherein the optical waveguide has two arms that form an optical modulator, and wherein each arm in the optical waveguide forming the optical modulator has a length of less than 50 µm;
 wherein the first semiconductor layer and the second semiconductor layer include electrical contacts configured to impart an electric potential across the semiconductor-oxide-semiconductor diode; and
 wherein the oxide layer has a dielectric constant more than ten times larger than that of silicon dioxide.

22. The integrated circuit of claim 21,
wherein the optical modulator includes a Mach-Zehnder interferometer (MZI).

* * * * *

UNITED STATES PATENT AND TRADEMARK OFFICE
CERTIFICATE OF CORRECTION

PATENT NO. : 9,535,308 B2
APPLICATION NO. : 14/036964
DATED : January 3, 2017
INVENTOR(S) : Li et al.

It is certified that error appears in the above-identified patent and that said Letters Patent is hereby corrected as shown below:

On the Title Page

Column 1, under Inventors, Lines 5-6, delete "San Deigo," and insert -- San Diego, --, therefor.

In the Specification

In Column 8, Line 10, delete "Kromers" and insert -- Kramers --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*